United States Patent
Lee et al.

(10) Patent No.: US 7,463,406 B2
(45) Date of Patent: Dec. 9, 2008

(54) METHOD FOR FABRICATING MICROELECTROMECHANICAL OPTICAL DISPLAY DEVICES

(75) Inventors: Chia-Sheng Lee, Hsinchu (TW); Han-Tu Lin, Hsinchu (TW); Jia-Fam Wong, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 12/038,221

(22) Filed: Feb. 27, 2008

(65) Prior Publication Data

US 2008/0158650 A1 Jul. 3, 2008

Related U.S. Application Data

(63) Continuation-in-part of application No. 11/093,498, filed on Mar. 30, 2005, now Pat. No. 7,358,102.

(30) Foreign Application Priority Data

Dec. 31, 2004 (TW) ............................... 93141738 A

(51) Int. Cl.
G02B 26/00 (2006.01)
(52) U.S. Cl. ................. 359/291; 359/224; 359/290; 359/292; 359/295; 359/298; 345/85; 345/108
(58) Field of Classification Search ................. 359/223, 359/224, 290–292, 295, 298; 345/85, 108
See application file for complete search history.

(56) References Cited

U.S. PATENT DOCUMENTS

| | | | |
|---|---|---|---|
| 5,652,671 A | 7/1997 | Knipe et al. | |
| 5,835,255 A | 11/1998 | Miles | |
| 6,661,561 B2 * | 12/2003 | Fitzpatrick et al. | .......... 359/291 |
| 6,958,847 B2 | 10/2005 | Lin | |
| 7,016,099 B2 | 3/2006 | Ikeda et al. | |
| 2002/0015215 A1 | 2/2002 | Miles | |
| 2002/0183977 A1 | 12/2002 | Sui et al. | |
| 2003/0152872 A1 | 8/2003 | Miles | |
| 2003/0203627 A1 | 10/2003 | Pang | |
| 2004/0027636 A1 | 2/2004 | Miles | |

* cited by examiner

*Primary Examiner*—Evelyn A. Lester
(74) *Attorney, Agent, or Firm*—Thomas, Kayden, Horstemeyer & Risley

(57) ABSTRACT

A microelectromechanical optical display devices is provided. An optical layer is disposed on a substrate. A plurality of posts are disposed on the optical layer. A reflective layer is disposed on the plurality of posts. A flexible layer is disposed on the reflective layer, wherein edge of the reflective layer is separated from edge of the flexible layer by a distance equal to or smaller than about 2 μm.

18 Claims, 13 Drawing Sheets

METHOD FOR FABRICATING MICROELECTROMECHANICAL OPTICAL DISPLAY DEVICES

This application is a continuation-in-part (CIP) of U.S. application Ser. No. 11/093,498 filed on Mar. 30, 2005, which is hereby incorporated by reference.

BACKGROUND

The invention relates to microelectromechanical system (MEMS) processes, and more particularly, to microelectromechanical optical (MEMO) display device processes.

A wide variety of optical devices may currently be fabricated using micromachining and microelectronic fabrication techniques.

In some cases, for example, MEMS devices may comprise optical components, specifically referred to as MEMO display devices. One example of a MEMO display device is the interference modulator described in U.S. Pat. No. 5,835,255, which may be fabricated in an array and used in a reflective display wherein each interference modulator serves as a pixel to provide a desired optical response.

FIG. 1A shows a side view of a conventional interference modulator in two states. Referring to FIG. 1, numeral 102 denotes a pixel in an undriven state and numeral 104 denotes a pixel in a driven state. In the driven state, a mirror plate 110 is in direct contact with a substrate 120 such that the interference modulator absorbs incident light and appears black to a viewer 140 through the substrate 120. In the undriven state, an air gap 112 exists between the mirror plate 110 and the substrate 120 such that the interference modulator appears to be a bright color (for example, blue). Additionally, numeral 130 denotes a post for supporting the mirror plate 110.

FIG. 1B shows a plane view of a conventional semi-finished optical MEMS device and FIG. 1C shows a cross-section of a-a' of FIG. 1B. Referring to FIGS. 1B and 1C, the conventional semi-finished optical MEMS device 150 comprises a plurality of conductive lines 153 disposed on a glass substrate 152 with a dielectric layer 154 overlaid thereon. A plurality of reflective members 158 is supported by a plurality of posts 156 in a sacrificial layer 171 which will be removed thereafter. The conductive lines 153 are perpendicular to the reflective members 158, and the overlapping areas define a plurality of pixel areas 151a, 151b, 151c, 151d, 151e and 151f. Referring to FIG. 1C, the reflective member 158 typically is a stack layer including a metal layer 161 with high reflectivity, such as Al, and a flexible layer 163, such as Ni. However, when patterning the high reflective layer 161 and the flexible layer 163 using a resist layer 159 as a mask, serious undercut 172 occurs because high reflective layer 161 and flexible layer 163 have distinct etching bias and specifically etching rate of Ni is more than 5 times of Al. Therefore, as shown in FIG. 1C, the high reflective layer 161 often remains to affect display quality or cause short. In some serious cases, edge of the flexible layer 163 is separated from edge of the reflective layer 161 by a distance d1 larger than 2 μm.

U.S. Patent Application Publication No. 2002/0015215 to Miles, the entirety of which is hereby incorporated by reference, discloses a method for forming an interference modulator, comprising patterning an aluminum layer to form a mirror plate.

U.S. Patent Application Publication No. 2003/0152872 to Miles, the entirety of which is hereby incorporated by reference, discloses a method for forming an interference modulator, comprising forming a stack layer on a substrate and exposing a photosensitive layer deposited thereon using the stack layer as a photomask.

U.S. Patent Application Publication No. 2004/0027636 to Miles, the entirety of which is hereby incorporated by reference, discloses a method for forming an interference modulator, comprising forming a light-absorbing layer on a portion of a substrate.

SUMMARY

A microelectromechanical optical display devices is provided. An optical layer is disposed on a substrate. A plurality of posts are disposed on the optical layer. A reflective layer is disposed on the plurality of posts. A flexible layer is disposed on the reflective layer, wherein an edge of the reflective layer is separated from an edge of the flexible layer by a distance equal to or smaller than about 2 μm.

Methods of forming microelectromechanical optical display devices are provided. In an exemplary embodiment of forming a microelectromechanical optical display device, an optical layer is formed on a substrate. A sacrificial layer is formed on the optical layer. The sacrificial layer is patterned to form a plurality of holes therein. A supporting material fills the holes to form a plurality of posts. A reflective layer is formed on the sacrificial layer and the posts. A flexible layer is formed on the reflective layer. A photoresist layer is formed on a portion of the flexible layer. By performing a wet etching using the photoresist layer as a mask, a portion of the flexible layer is removed to form a patterned flexible layer, wherein the wet etching is stopped on the reflective layer. The photoresist layer is removed. By performing a dry etching using the patterned flexible layer as a mask, a portion of the reflective layer is removed to form a patterned reflective layer, wherein a mechanical layer is formed with the patterned flexible layer and the patterned reflective layer. The sacrificial layer is removed and thus the mechanical layer is supported by the posts.

In another embodiment of forming a microelectromechanical optical display device, removal of the photoresist layer can be subsequent to formation of the patterned reflective layer.

The mechanical layer comprising the patterned flexible layer defined by wet etching and the patterned reflective layer defined by dry etching can thus be formed without undercut issue during fabrication, improving yield and device performance.

DESCRIPTION OF THE DRAWINGS

The invention will become more fully understood from the detailed description given in the following and the accompanying drawings, given by way of illustration only and thus not intended to be limitative, and wherein.

DETAILED DESCRIPTION

First Embodiment

Methods of forming microelectromechanical optical (MEMO) display devices are provided. The MEMO display devices can be interference modulators. FIGS. 2A-2G are sectional views of a first embodiment of a manufacturing process for fabricating an embodiment of a MEMO display device. A representative interference modulator is illustrated, but is not intended to limit the disclosure. In order to simplify the illustration, FIGS. 2A-2G show one pixel, although there may be numerous pixels.

Figure 2A:
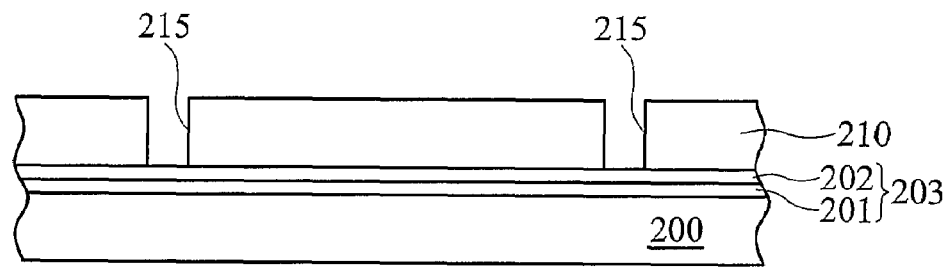
FIGS. 2A-2G are sectional views of a first embodiment of a manufacturing process for fabricating an embodiment of a MEMO display device.

In FIG. 2A, an optical layer 203 is formed on a transparent substrate 200. An exemplary method of forming the optical stack is described as follows. A transparent conductive layer 201 is formed on the substrate 200 by, for example, evaporation and deposition. A dielectric layer 202 is then formed on the transparent conductive layer 201 by, for example, deposition. In this embodiment, the optical layer 203 comprises the transparent conductive layer 201 and the dielectric layer 202. The substrate 200 can be a glass, quartz, mylar or plastic substrate. The material of the transparent conductive layer 201 can be indium-tin-oxide (ITO), indium-zinc-oxide (IZO) or other transparent metals or combination thereof. The material of the dielectric layer 202 can be aluminum oxide, silicon oxide, silicon nitride, silicon oxynitride or other transparent dielectric materials.

A sacrificial layer 210 is then formed on the optical layer 203. The sacrificial layer 210 can be a molybdenum or amorphous silicon layer formed by, for example, deposition. By performing conventional photolithography and etching processes, a plurality of holes 215 exposing the optical layer 203 are formed in the sacrificial layer 210.

Figure 2B:
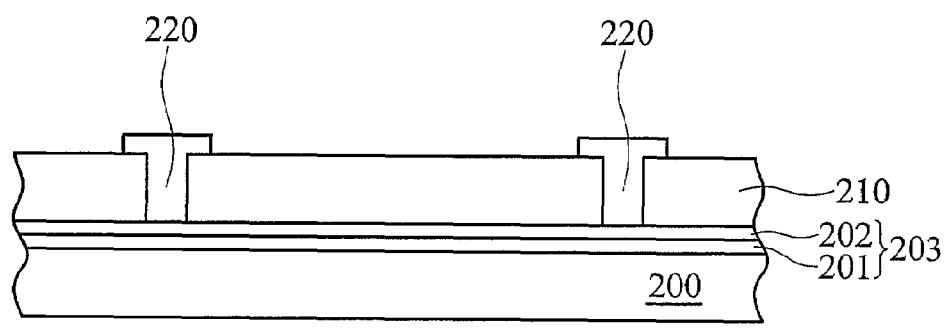

A supporting material such as photoresist or polymer fills in the holes 215. Conventional photolithography and etching processes are then performed to define a plurality of posts 220 attached the optical layer 203, as shown in FIG. 2B. In an embodiment of the invention, the post has a thickness of about 2000 Å to 8000 Å.

Figure 2C:
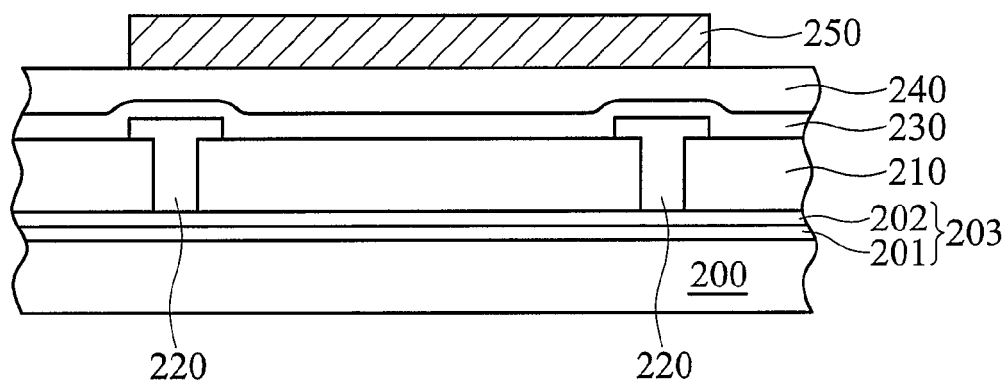

In FIG. 2C, a reflective layer 230 is formed on the sacrificial layer 210 and the posts 220. A flexible layer 240 is then formed on the reflective layer 230. In this embodiment, the reflective layer 230 can be an aluminum layer, a silver layer or other metal layer with high reflectivity formed by, for example, sputtering, and has a thickness of about 200 Å to 500 Å. The flexible layer 240 can be a nickel layer, a titanium layer or other metal layer with exceptional mechanical strength and has a thickness of about 800 Å to 2000Å. By performing coating and patterning, a photoresist layer 250 is then formed on a portion of the flexible layer 230.

Figure 2D:
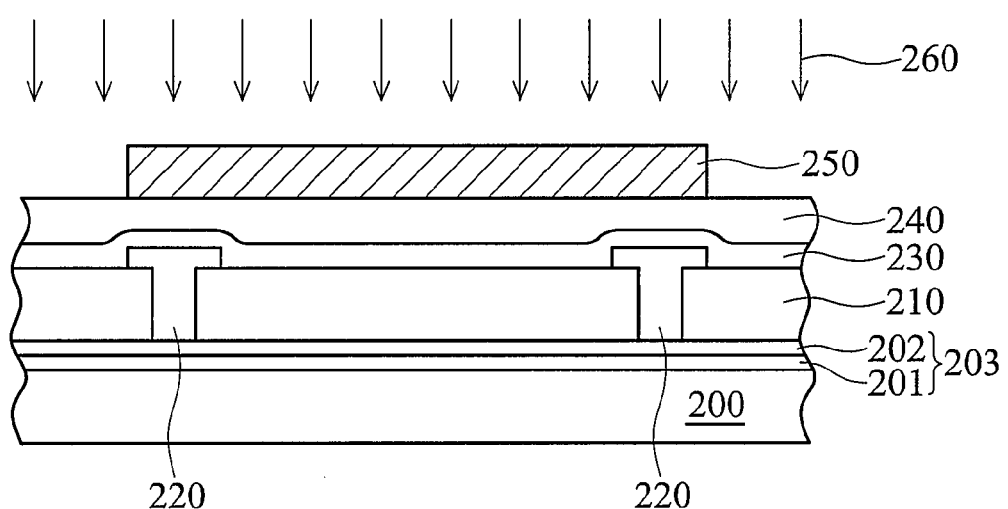
Figure 2E:
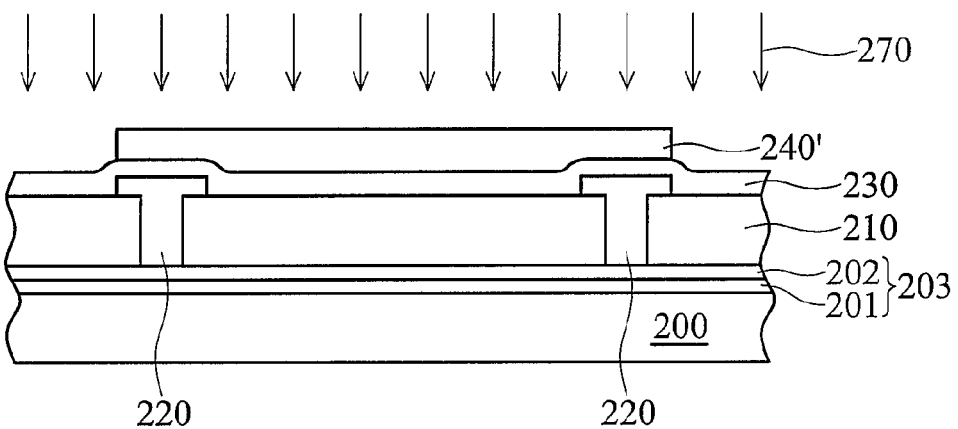

Referring to FIG. 2D, by performing a wet etching 260 using the photoresist layer 250 as a mask, a portion of the flexible layer 240 is removed to form a patterned flexible layer 240' (shown in FIG. 2E) . The wet etching 260 is stopped on the reflective layer 230. The etching selectivity of the flexible layer 240 over the reflective layer 230 is greater than or equal to 1, preferably greater than or equal to 5, in the step of wet etching 260. When the flexible layer 240 is a nickel layer or a titanium layer, the wet etching 260 can employ a $HNO_3$ solution.

The photoresist layer 250 is then removed by performing an ashing process, such that a structure shown in FIG. 2E is obtained.

Figure 2F:
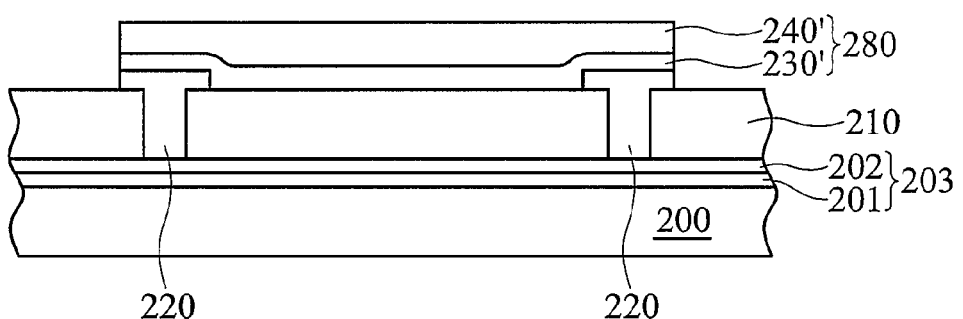

Referring to FIG. 2E, by performing a dry etching 270 (i.e. anisotropic etching) using the patterned flexible layer 240' as a mask, a portion of the reflective layer 230 is removed to form a patterned reflective layer 230'. In this embodiment, a mechanical layer 280 (or mirror plate) is formed with the patterned flexible layer 240' and the patterned reflective layer 230', as shown in FIG. 2F. When the reflective layer 230 is an aluminum layer, a silver layer or other metal layer, the dry etching 270 can employ an etching gas comprising $Cl_2$, $BCl_3$, $O_2$, He and $CF_4$, or comprising $SF_6$, $O_2$, He and $CF_4$. Note that this embodiment employs double etching stages (i.e. wet etching and dry etching) such that the profile of the mechanical layer 280 can be precisely controlled without etch undercut during fabrication, improving yield and device performance.

Figure 2G:
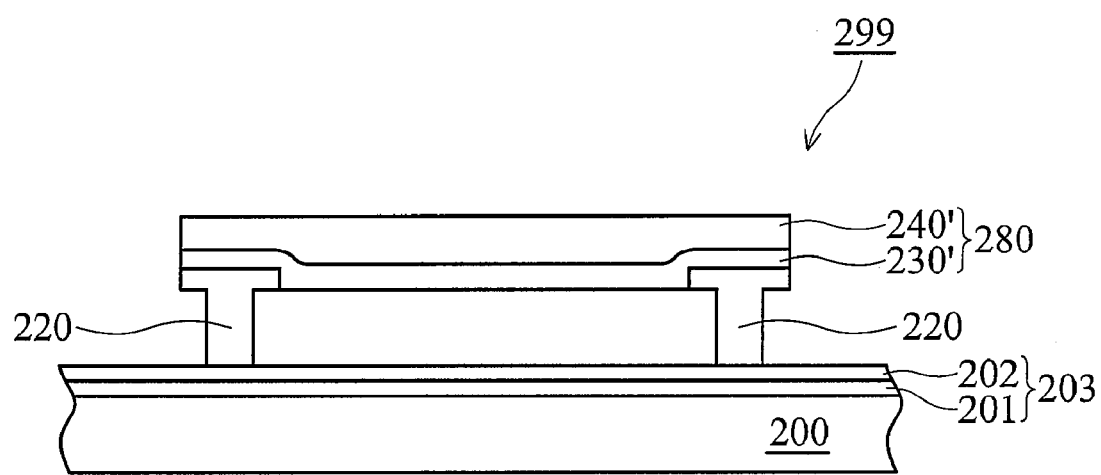

In FIG. 2G, the remains of sacrificial layer 210 are removed by, for example, a $XeF_2$, $BrF_3$, $ClF_3$, $BrF_5$ or $IF_5$ etcher to release the mechanical layer 280. That is, the mechanical layer 280 is supported by the posts 220. An interference modulator 299 is thus obtained. An edge of the reflective layer 230' is separated from an edge of the flexible layer 240' by a distance (not marked) equal to or smaller than about 2 μm, and preferably, about 50 Å to 300 Å.

Second Embodiment

FIGS. 3A-3G are sectional views of a second embodiment of a manufacturing process for fabricating an embodiment of a MEMO display device. A representative interference modulator is illustrated, but is not intended to limit the disclosure. In order to simplify the illustration, FIGS. 3A-3G show one pixel, although there may be numerous pixels. In this embodiment, removal of the photoresist layer occurs subsequent to formation of the patterned reflective layer.

Figure 3A:
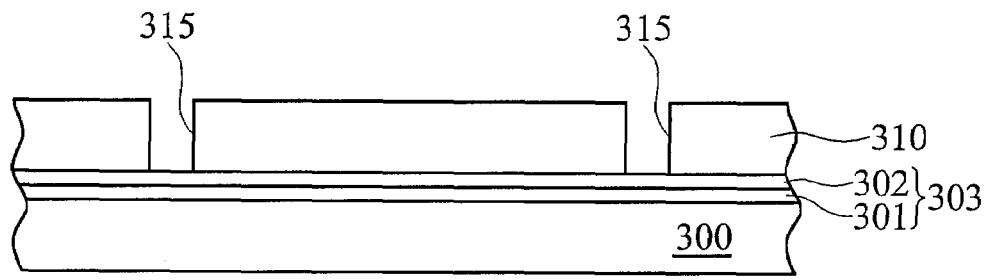
FIGS. 3A-3G are sectional views of a second embodiment of a manufacturing process for fabricating an embodiment of a MEMO display device.

In FIG. 3A, an optical layer 303 is formed on a transparent substrate 300. An exemplary method of forming the optical stack is described as follows. A transparent conductive layer 301 is formed on the substrate 300 by, for example, evaporation and deposition. A dielectric layer 302 is then formed on the transparent conductive layer 301 by, for example, deposition. In this embodiment, the optical layer 303 comprises the transparent conductive layer 301 and the dielectric layer 302. The substrate 300 can be a glass, quartz, mylar or plastic substrate. The material of the transparent conductive layer 301 can be ITO, IZO or other transparent metals. The material of the dielectric layer 302 can be aluminum oxide, silicon oxide, silicon nitride, silicon oxynitride or other transparent dielectric materials.

A sacrificial layer 310 is then formed on the optical layer 303. The sacrificial layer 310 can be a molybdenum layer or an amorphous silicon layer formed by, for example, deposition. By performing conventional photolithography and etching processes, a plurality of holes 315 exposing the optical layer 303 are formed in the sacrificial layer 310.

Figure 3B:
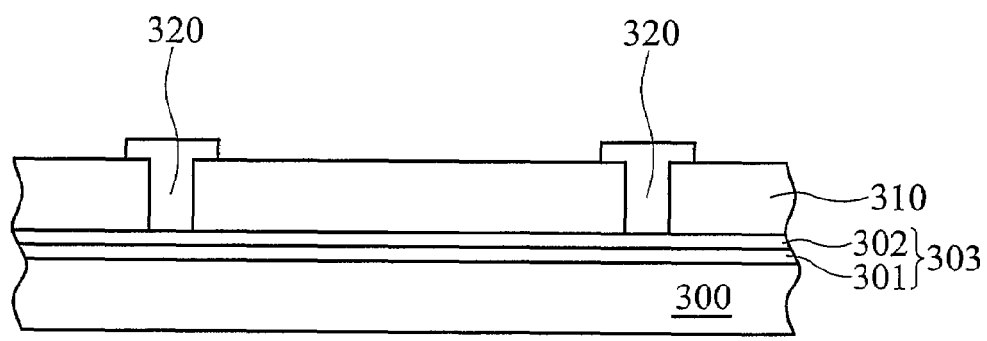

A supporting material, such as photoresist or polymer, fills in the holes 315. Conventional photolithography and etching processes are then performed to define a plurality of posts 320, as shown in FIG. 3B.

Figure 3C:
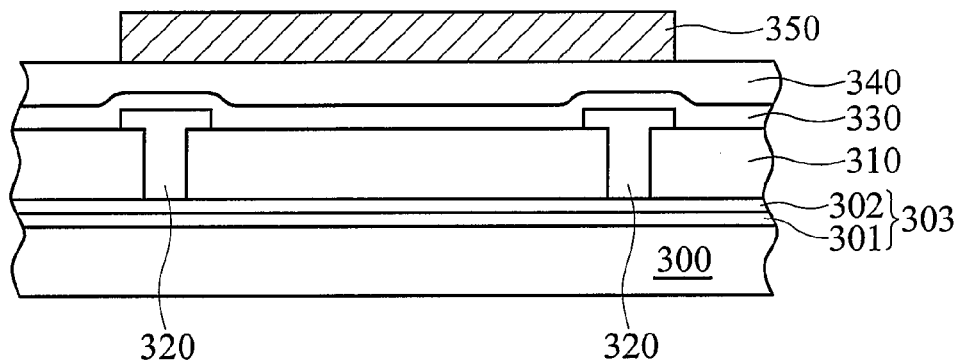

In FIG. 3C, a reflective layer 330 is formed on the sacrificial layer 310 and the posts 320. A flexible layer 340 is then formed on the reflective layer 330. In this embodiment, the reflective layer 330 can be an aluminum layer, a silver layer or other metal layer with high reflectivity formed by, for example, sputtering. The flexible layer 340 can be a nickel layer, a titanium layer or other metal layer with exceptional mechanical strength. By performing coating and patterning, a photoresist layer 350 is then formed on a portion of the flexible layer 330.

Figure 3D:
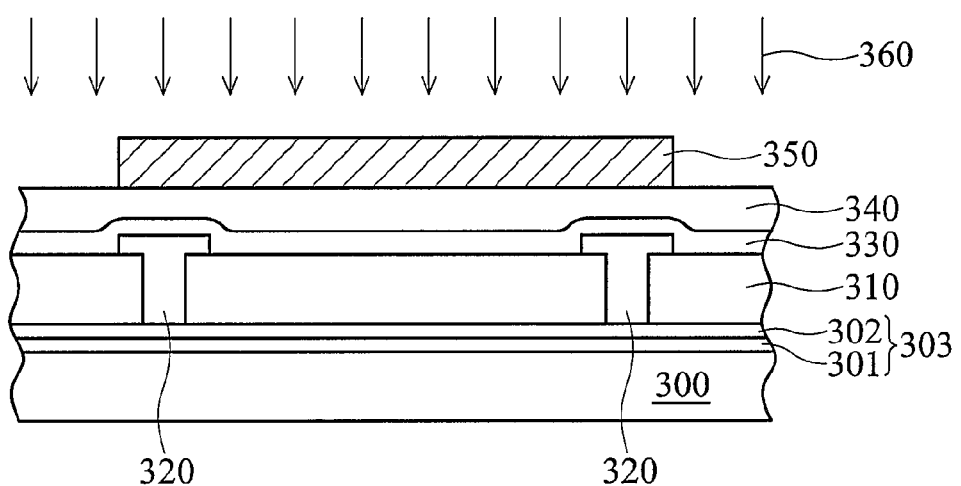
Figure 3E:
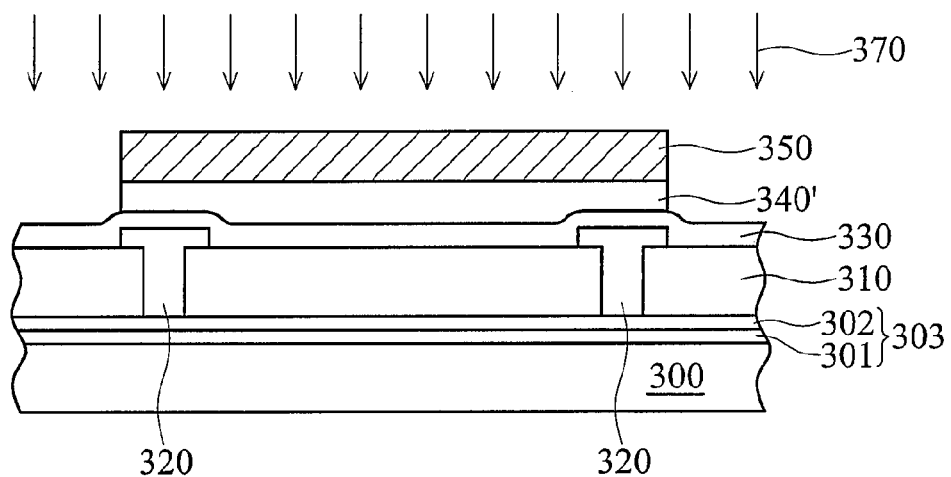

Referring to FIG. 3D, by performing a wet etching 360 using the photoresist layer 350 as a mask, a portion of the flexible layer 340 is removed to form a patterned flexible layer 340' (shown in FIG. 3E). The wet etching 360 is stopped on the reflective layer 330. The etching selectivity of the flexible layer 340 over the reflective layer 330 is greater than or equal to 1, preferably, greater than or equal to 5, in the step of wet etching 360. When the flexible layer 340 is a nickel layer or a titanium layer, the wet etching 360 can employ a $HNO_3$ solution.

Figure 3F:
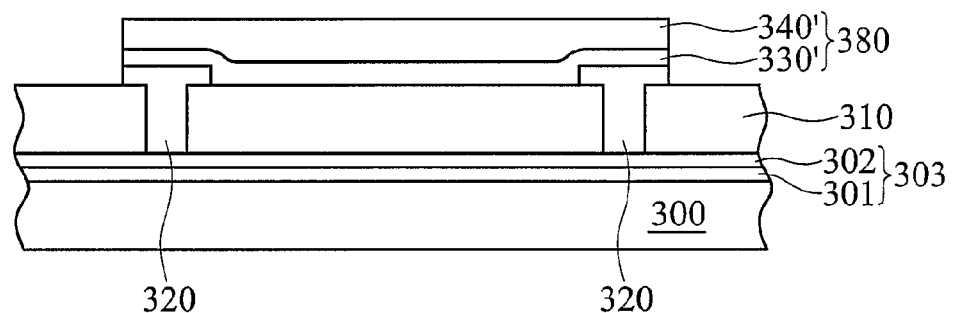

Referring to FIG. 3E, by performing a dry etching 370 (i.e. anisotropic etching), using the photoresist layer 350 and the patterned flexible layer 340' as a mask, a portion of the reflective layer 330 is removed to form a patterned reflective layer 330'. In this embodiment, a mechanical layer 380 (or mirror plate) is formed with the patterned flexible layer 340' and the patterned reflective layer 330', as shown in FIG. 3F. When the reflective layer 330 is an aluminum layer, a silver layer or other metal layer, the dry etching 370 can employ an etching gas comprising $Cl_2$, $BCl_3$, $O_2$, He and $CF_4$ or comprising $SF_6$, $O_2$, He and $CF_4$. Note that this embodiment employs double etching stages (i.e. wet etching and dry etching) such that the profile of the mechanical layer 380 can be precisely controlled without etch undercut during fabrication, improving yield and device performance.

After formation of the mechanical layer 380, the photoresist layer 350 is then removed by performing an ashing process. A structure shown in FIG. 3F is thus obtained.

Figure 3G:
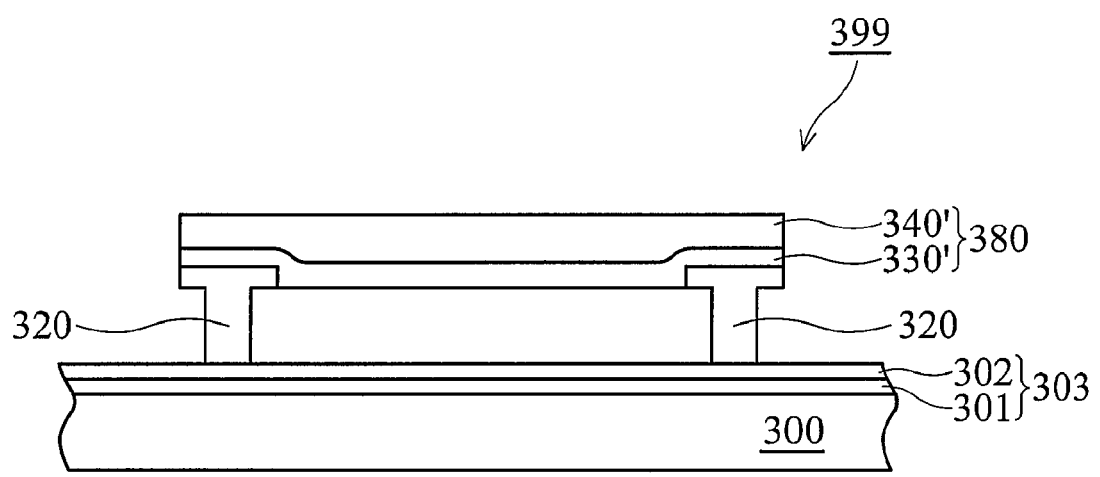

In FIG. 3G, the remained portion of sacrificial layer 310 is removed by, for example, a $XeF_2$, $BrF_3$, $ClF_3$, $BrF_5$ or $IF_5$ etcher to release the mechanical layer 380. Significantly, the mechanical layer 380 is supported by the posts 320. An interference modulator 399 is thus obtained. An edge of the reflective layer 330' is separated from an edge of the flexible layer 340' by a distance (not marked) equal to or smaller than about 2 μm, and preferably, about 50 Å to 300 Å.

Third Embodiment

Figure 4A:
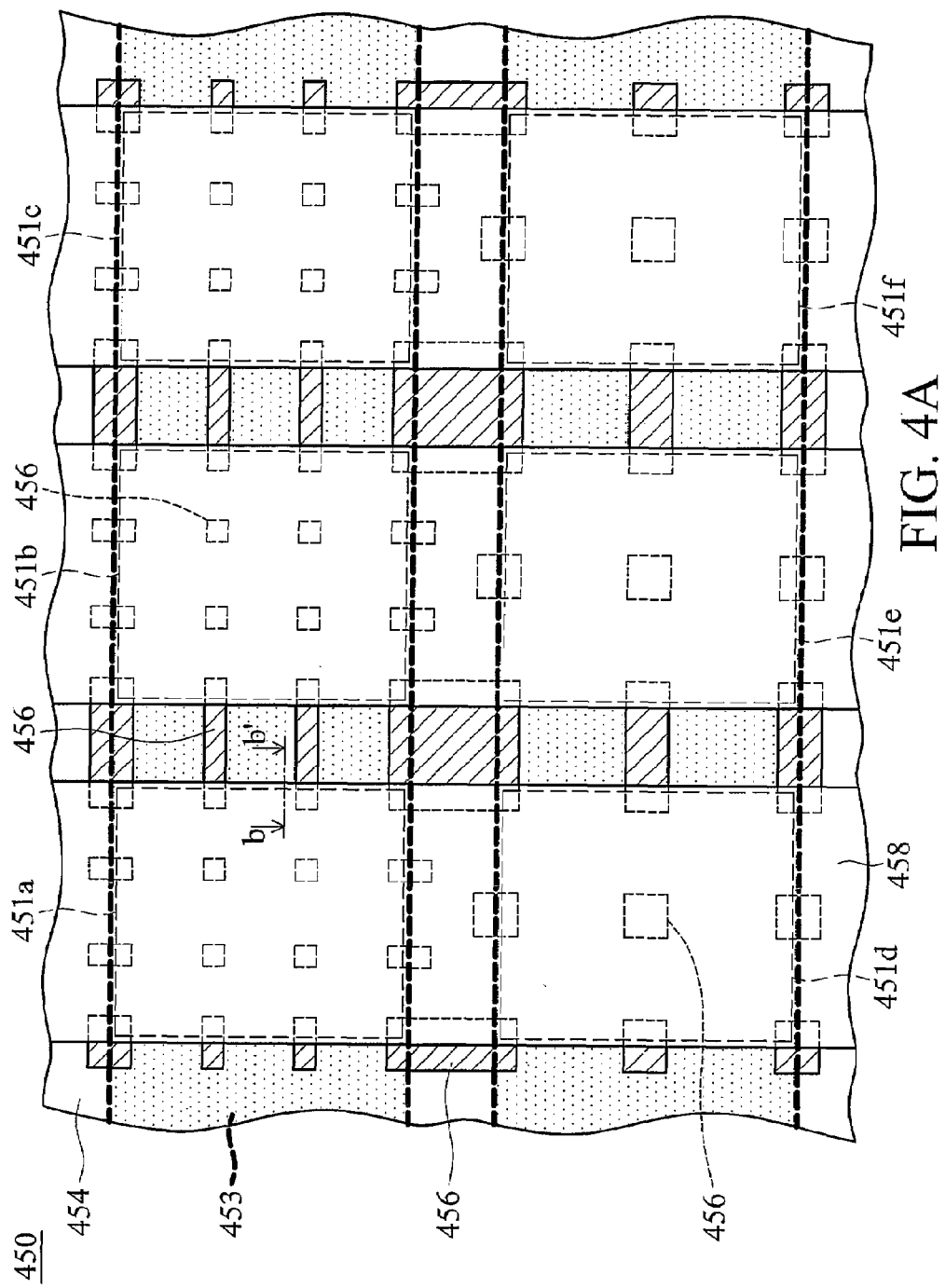
FIG. 4A shows a plane view of a semi-finished optical MEMS device of an embodiment of the invention.
Figure 4B:
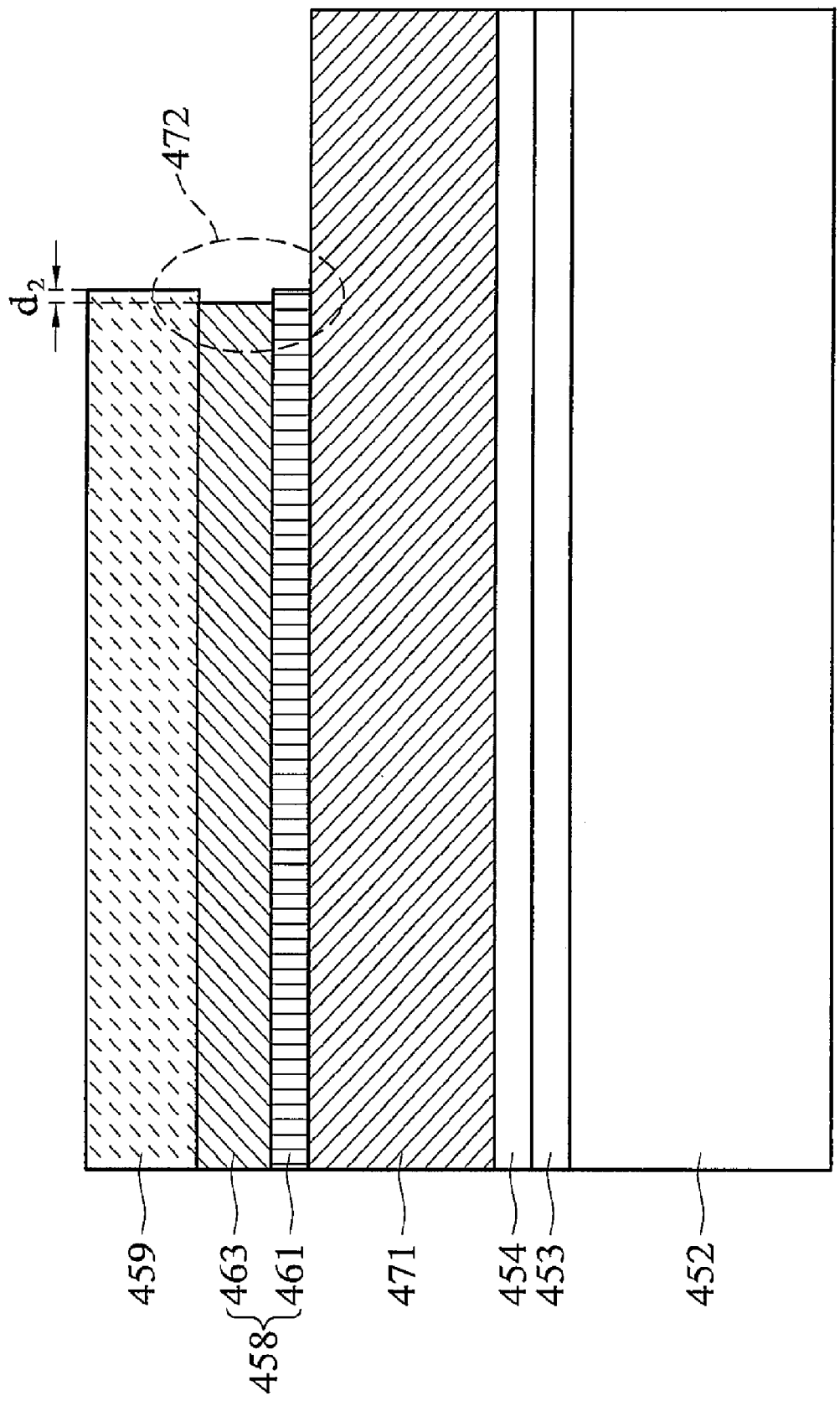
FIG. 4B shows a cross-section of b-b' of FIG. 4A.

FIG. 4A shows a plane view of a semi-finished optical MEMS device of an embodiment of the invention and FIG. 4B shows a cross-section of b-b' of FIG. 4A. Referring to FIGS. 4A and 4B, the semi-finished optical MEMS device 450, which may be formed by one or more steps of the method of the first embodiment or the second embodiment, comprises a plurality of conductive lines 453 disposed on a glass substrate 452 with a dielectric layer 454 overlaid thereon. A plurality of reflective members 458 is supported by a plurality of posts 456 in a sacrificial layer 471 which will be removed thereafter. The post 456 has a thickness of about 2000 Å to 8000 Å. The conductive lines 453 are perpendicular to the reflective members 458, and the overlapping areas define a plurality of pixel areas 451a, 451b, 451c, 451d, 451e and 451f. The reflective member 458 typically is a stack layer including a reflective layer 461, such as Al, and a flexible layer 463, such as Ni, foe example. The reflective layer 461 has a thickness of about 200 Å to 500 Å.

Figure 1A:
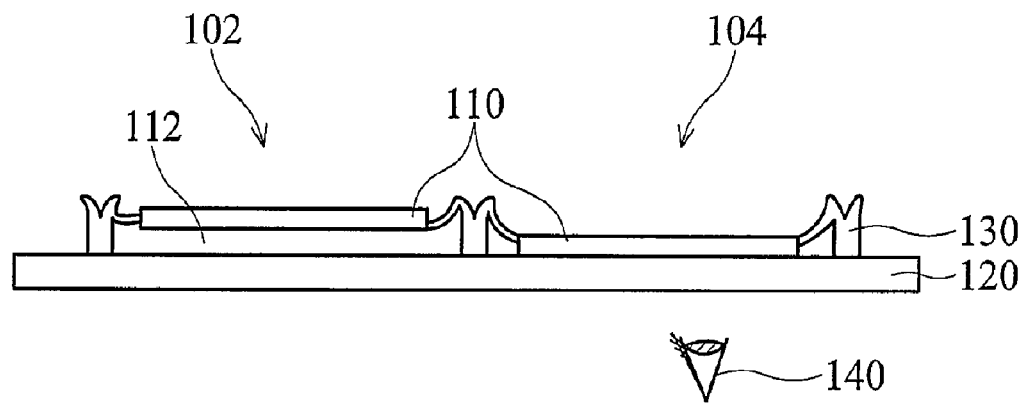
FIG. 1A shows a side view of a conventional interference modulator in two states.
Figure 1B:
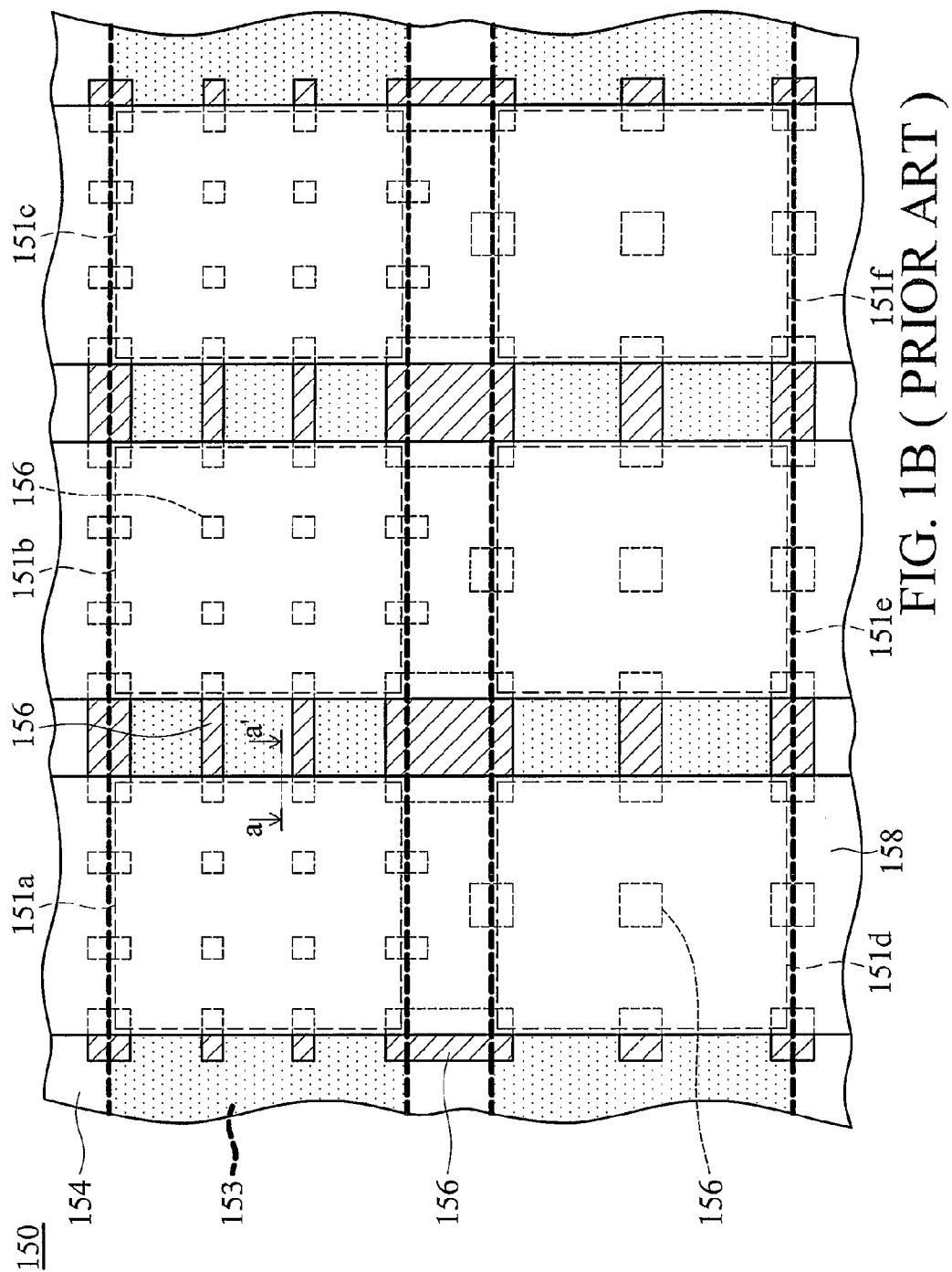
FIG. 1B shows a plane view of a conventional semi-finished optical MEMS device.
Figure 1C:
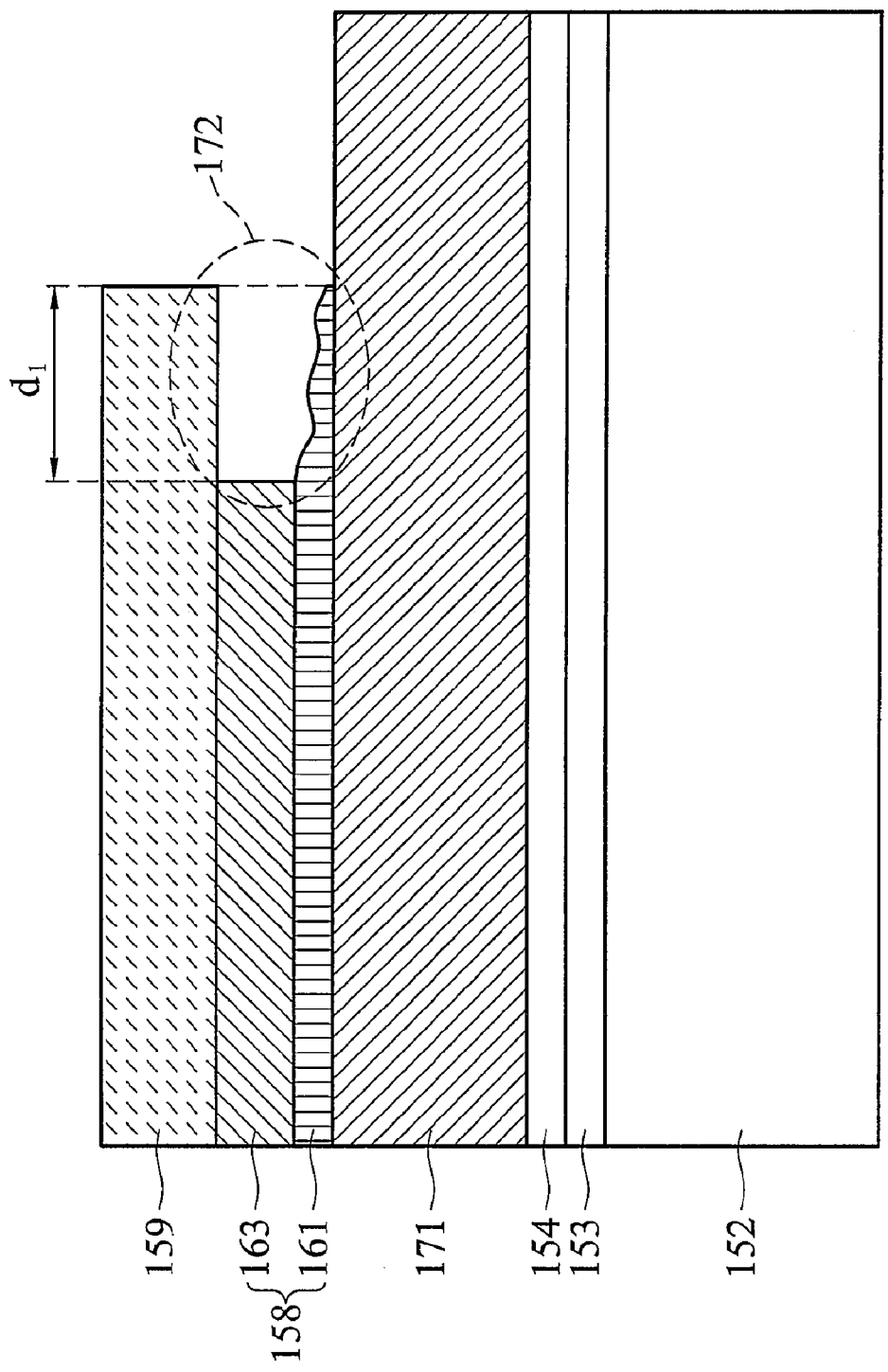
FIG. 1C shows a cross-section of a-a' of FIG. 1B.

In the embodiment, when patterning the reflective member 458, because the reflective member 458 is defined by two steps, which the flexible layer 463 is first etched using the photoresist layer 459 as a mask and followed by etching the reflective layer 461 using the flexible layer 463 as a mask, only a small amount of undercut 472 may occur at edge of the flexible layer 463. This may come from etching selectivity between the flexible layer 463 and the reflective layer 461 still not great enough. However, comparing FIG. 4B with FIG. 1C, the distance between edge of the reflective layer 461 and edge of the flexible layer 463 $d_2$ which is equal to or small than about 2 μm of the embodiment is much smaller than the undercut $d_1$ of prior art (shown in FIG. 1C), and furthermore, in a preferred embodiment of the invention, the distance $d_2$ is about 50 Å to 300 Å.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An MEMO display device, comprising:
   a substrate;
   an optical layer disposed on the substrate;
   a plurality of posts disposed on the optical layer;
   a reflective layer disposed on the plurality of posts; and
   a flexible layer disposed on the reflective layer, wherein edge of the reflective layer is separated from edge of the flexible layer by a distance equal to or smaller than about 2 μm.

2. The MEMO display device according to claim 1, wherein the substrate is transparent.

3. The MEMO display device according to claim 1, wherein optical layer is transparent and conductive.

4. The MEMO display device according to claim 1, wherein the optical layer includes a first layer and a second layer disposed on the first layer, and the first layer is comprised of indium-tin-oxide (ITO), indium-zinc-oxide (IZO) or the combination thereof.

5. The MEMO display device according to claim 4, wherein the second layer is comprised of aluminum oxide, silicon oxide, silicon nitride, silicon oxynitride or combinations thereof.

6. The MEMO display device according to claim 1, wherein the optical layer includes a first layer and a second layer disposed on the first layer, and the second layer is comprised of aluminum oxide, silicon oxide, silicon nitride, silicon oxynitride or combinations thereof.

7. The MEMO display device according to claim 1, wherein the posts are comprised of polymer.

8. The MEMO display device according to claim 1, wherein the reflective layer is comprised of aluminum or silver and the flexible layer comprises nickel or titanium.

9. The MEMO display device according to claim 1, wherein the reflective layer is comprised of metal.

10. The MEMO display device according to claim 9, wherein the flexible layer is comprised of metal.

11. The MEMO display device according to claim 1, wherein the reflective layer is comprised of aluminum or silver.

12. The MEMO display device according to claim 1, wherein the flexible layer comprises nickel or titanium.

13. The MEMO display device according to claim 1, wherein the reflective layer has a thickness of about 200 Å to 500 Å.

14. The MEMO display device according to claim 13, wherein the flexible layer has a thickness of about 800 Å to 2000 Å.

15. The MEMO display device according to claim 14, wherein the post has a thickness of about 2000 Å to 9000 Å.

16. The MEMO display device according to claim 1, wherein the flexible layer has a thickness of about 800 Å to 2000 Å.

17. The MEMO display device according to claim 1, wherein the post has a thickness of about 2000 Å to 9000 Å.

18. The MEMO display device according to claim 1, wherein the distance is about 50 Å to 300 Å.

* * * * *